US010523137B2

(12) United States Patent
Isaji

(10) Patent No.: US 10,523,137 B2
(45) Date of Patent: Dec. 31, 2019

(54) WIRE CONNECTING STRUCTURE AND WIRE CONNECTING METHOD OF THREE-PHASE MOTOR, AND THREE-PHASE MOTOR

(71) Applicant: NIDEC SANKYO CORPORATION, Nagano (JP)

(72) Inventor: Naoya Isaji, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 0 days.

(21) Appl. No.: 16/019,558

(22) Filed: Jun. 27, 2018

(65) Prior Publication Data

US 2019/0006963 A1    Jan. 3, 2019

(30) Foreign Application Priority Data

Jun. 28, 2017   (JP) ................................. 2017-126243

(51) Int. Cl.
*H02P 1/26* (2006.01)
*H02P 1/46* (2006.01)
*H02K 17/08* (2006.01)

(52) U.S. Cl.
CPC ............... *H02P 1/265* (2013.01); *H02P 1/46* (2013.01); *H02K 17/08* (2013.01)

(58) Field of Classification Search
CPC ..... H02K 3/18; H02K 15/095; H02K 15/0075
See application file for complete search history.

(56) References Cited

U.S. PATENT DOCUMENTS

2006/0152188 A1* 7/2006 Yasuhara ................. H02K 3/28
318/727

FOREIGN PATENT DOCUMENTS

| DE | 102009059241 | 6/2011 |
| EP | 2940834 | 11/2015 |
| JP | 2016-178845 | 10/2016 |

OTHER PUBLICATIONS

"Search Report of Europe Counterpart Application", dated Oct. 31, 2018, p. 1-p. 7.

* cited by examiner

*Primary Examiner* — Karen Masih
(74) *Attorney, Agent, or Firm* — JCIPRNET

(57) ABSTRACT

Provided is a wire connecting structure of coils of a three-phase motor, a wire connecting method and three-phase motor, which is capable of reducing a size of a short circuit terminal for a neutral point. The wire connecting structure is a wire connecting structure of coils which are wound to each salient-pole in a three-phase motor having respective salient-pole of a U phase, a V phase and a W phase, the coils of the salient-poles belonging to any two phases among the U phase, the V phase and the W phase are formed by a single continuous first conducting wire, and the coil of the salient-pole belonging to the rest one phase is formed by a single continuous second conducting wire.

9 Claims, 2 Drawing Sheets

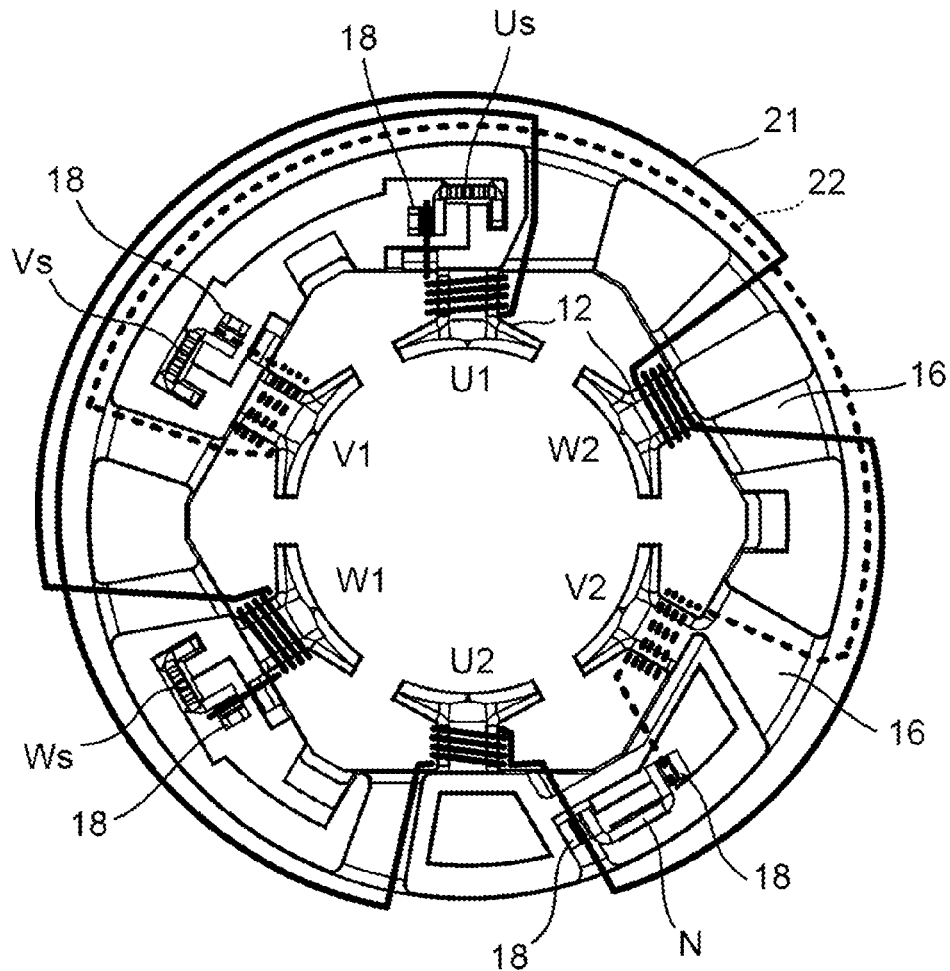
FIG. 3
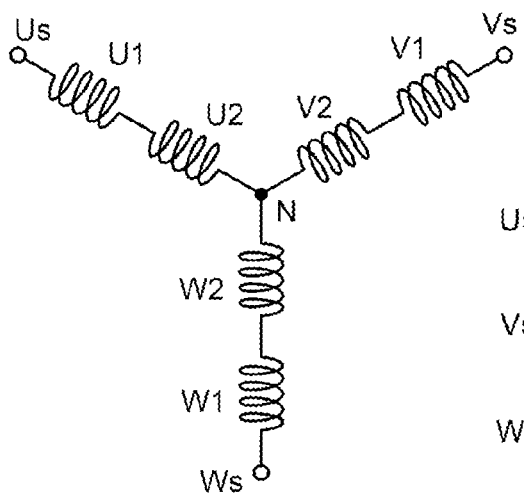
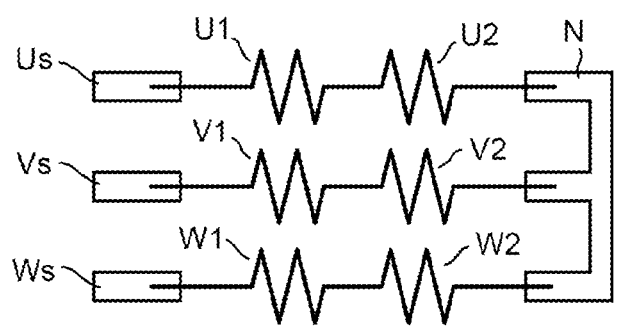
FIG. 4(a) (Prior Art)   FIG. 4(b) (Prior Art)

WIRE CONNECTING STRUCTURE AND WIRE CONNECTING METHOD OF THREE-PHASE MOTOR, AND THREE-PHASE MOTOR

CROSS REFERENCE TO RELATED APPLICATION

The present invention claims priority under 35 U.S.C. § 119 to Japanese Application No. 2017-126243 filed Jun. 28, 2017, the entire content of which is incorporated herein by reference.

BACKGROUND

Technical Field

The disclosure relates to a wire connecting structure and a wire connecting method of coils in a stator of a three-phase motor and to a three-phase motor having such a wire connecting structure.

Related Art

As for a three-phase motor which includes an induction motor, a synchronous motor and a brushless motor, in a stator, a coil is formed in each phase (a U phase, a V phase and a W phase) by winding a conducting wire around a salient-pole made of an iron core for example. Usually, there are multiple salient-poles for each phase, and the salient-poles of each phase are arranged with equal intervals in a circumferential direction in an order of the salient-pole of the U phase→the salient-pole of the V phase→the salient-pole of the W phase→ . . . . The coil wound on the salient-pole is electrically series-connected in each phase. As a method for connecting the coil of each phase to each other, there are Δ wire connecting and Y wire connecting (also called as star wire connecting). When the three-phase motor is used as a servomotor and the like, Y wire connecting is often used.

FIG. 4($a$) is an equivalent circuit schematic of the Y wire connecting when each phase has two salient-poles, that is, when each phase has two coils. For example, in the U phase, the coils of two salient-poles U1, U2 are electrically connected in series, an external connection terminal Us is arranged on one end of the serial connection, and the other end is connected to a neutral point N. Similarly, in the V phase, the coils of two salient-poles V1, V2 are connected in series, an external connection terminal Vs is arranged on one end of the serial connection, and the other end is connected to the neutral point N; in the W phase, the coils of two salient-poles W1, W2 are connected in series, an external connection terminal Ws is arranged on one end of the serial connection, and the other end is connected to the neutral point N. If the stator is configured as an integral core, one conducting wire is used in each phase, and the conducting wire is sequentially wound to multiple salient-poles. When being wound sequentially, the same conducting wire also forms a jumper wire for the connection between the coils of different salient-poles. In this way, by using one conducting wire in each phase, connection locations between the conducting wires can be reduced, and the productivity of coil formation can be improved. In addition, the external connection terminals Us, Vs, and Ws are terminals used to connecting the three-phase motor to an external driver circuit and the like.

The neutral point N is a position to electrically connect the coil of the U phase, the coil of the V phase and the coil of the W phase to each other, and is configured as a short circuit terminal to perform the electrical connection to each coil. FIG. 4($b$) illustrates how the coil of each phase is connected to the neutral point N, which is formed as a short circuit terminal, in the three-phase motor represented by the equivalent circuit schematic shown in FIG. 4($a$). The part depicted continuously with a bold line in FIG. 4($b$) represents a part formed by a single conducting wire. In addition, patent literature 1 discloses that in a stator forming by split cores, the neutral point N which is a short circuit terminal is formed by a coupling member used for coupling the split cores, and the end of the coil of each phase is connected to the short circuit terminal.

[Patent literature 1] Japanese Laid-open No. 2016-178845

In a three-phase motor using Y wire connecting, one end of each of coils of a U phase, a V phase, and a W phase is connected to a short circuit terminal used to form a neutral point. Therefore, connection operation must be performed at three positions in the short circuit terminal forming the neutral point, and a man-hour for connection processing increases. Besides, the short circuit terminal forming the neutral point is different from an external connection terminal of each phase and is not a terminal used for the connection to an external circuit, thus the short circuit terminal is preferably small-sized, but the shape becomes large when the coil is connected to each of the three phases.

SUMMARY

The disclosure provides a wire connecting structure of a three-phase motor which can reduce a size of a short circuit terminal, a wire connecting method of coils which can reduce a man-hour of a connection processing, and a three-phase motor equipped with a stator having such a wire connecting structure.

A wire connecting structure of a three-phase motor of the disclosure is a wire connecting structure of coils which are wound on each salient-pole of the three-phase motor having salient-poles of a first phase, a second phase and a third phase, the coils of the salient-poles belonging to any two phases among the first phase, the second phase and the third phase are formed by a single continuous first conducting wire, and the coil of the salient-pole belonging to the rest one phase among the first phase, the second phase and the third phase is formed by a single continuous second conducting wire. According to the disclosure, the coils of the salient-poles of two phases are formed by the single continuous first conducting wire, thus positions to perform a connection processing can be reduced, and a size of the short circuit terminal can be reduced.

The wire connecting method of a three-phase motor of the disclosure is a wire connecting method of coils which are wound on each salient-pole of a three-phase motor having salient-poles of a first phase, a second phase and a third phase, which includes: a first process, in which a single first conducting wire is used to continuously wind the coils of the salient-poles belonging to any two phases among the first phase, the second phase and the third phase; and a second process, in which a single second conducting wire is used to wind the coil of the salient-pole belonging to the rest one phase among the first phase, the second phase and the third phase. In the disclosure, either of the first process and the second process may be implemented first as long as no interference is caused between the first conducting wire and the second conducting wire.

According to the disclosure, a single first conducting wire is used to continuously wind the coils of the salient-poles of two phases, thus the man-hour of the connection processing can be decreased.

The three-phase motor of the disclosure includes a stator having the wire connecting structure of the disclosure. Accordingly, the size of the short circuit terminal can be reduced, and the stator can be light-weighted.

In the disclosure, it may also be that one end of the first conducting wire is electrically connected to an external connection terminal which corresponds to one of the two phases, the other end of the first conducting wire is electrically connected to an external connection terminal which corresponds to the other of the two phases, and a middle point of the first conducting wire is electrically connected to the short circuit terminal of a neutral point without disconnecting the first conducting wire; one end of the second conducting wire is electrically connected to an external connection terminal which corresponds to the rest one phase, and the other end of the second conducting wire is electrically connected to the short circuit terminal. According to the configuration, the locations to perform the connection processing to the short circuit terminal of the neutral point can be reduced, and the size of the short circuit terminal can be reduced. Furthermore, in the disclosure, there may be multiple salient-poles for each phase; accordingly, the locations to perform the connection processing can be reduced even in a three-phase motor having many salient-poles. In this case, in an interval between one end of the first conducting wire and the middle point, the first conducting wire is wound to multiple salient-poles which correspond to one of the two phases, and in an interval between the middle point and the other end of the first conducting wire, the first conducting wire is wound to multiple salient-poles which correspond to the other of the two phases.

In the wire connecting method of the disclosure, when the short circuit terminal of the neutral point is arranged in this manner, for example, the first process includes: a neutral point extraction process, in which a starting end of the first conducting wire is extracted to the position of the external connection terminal which corresponds to one of the two phases, then while the position of the starting end is maintained, the first conducting wire is wound to the salient-pole which corresponds to one of the two phases and is extracted to the position of the short circuit terminal of the neutral point; and a process, which follows the neutral point extraction process, and in which the first conducting wire is wound to the salient-pole which corresponds to the other of the two phases while maintaining the state of being extracted to the position of the short circuit terminal, and a closing end of the first conducting wire is arranged to the position of the external connection terminal which corresponds to the other of the two phases; and in the second process, one end of the second conducting wire is arranged to the position of the external connection terminal which corresponds to the rest one phase, the other end of the second conducting wire is arranged to the position of the short circuit terminal; the wire connecting method further comprises a third process, in which the starting end of the first conducting wire is electrically connected to the external connection terminal which corresponds to one of the two phases, the first conducting wire is electrically connected to the short circuit terminal at the position of the short circuit terminal, the closing end of the first conducting wire is electrically connected to the external connection terminal which corresponds to the other of the two phases, one end of the second conducting wire is electrically connected to the external connection terminal which corresponds to the rest one phase, and the other end of the second conducting wire is electrically connected to the short circuit terminal.

According to the wire connecting structure of the disclosure, the coils of the salient-poles of two phases are formed by a single continuous first conducting wire, thus the locations to perform the connection processing are reduced, and the size of the short circuit terminal can be reduced. In addition, according to the wire connecting method of the disclosure, a single first conducting wire is used to continuously wind the coils of the salient-poles of two phases, thus the man-hour of the connection processing can be reduced.

BRIEF DESCRIPTION OF THE DRAWINGS

FIG. 3 is a schematic plan view of a stator illustrating a wire connecting structure of a coil.

FIG. 4(*a*) is an equivalent circuit schematic showing a Y wire connecting, FIG. 4(*b*) is a drawing illustrating an existing wire connecting structure of a three-phase motor.

DESCRIPTION OF THE EMBODIMENTS (Stator Structure of Three-Phase Motor)

Figure 1:
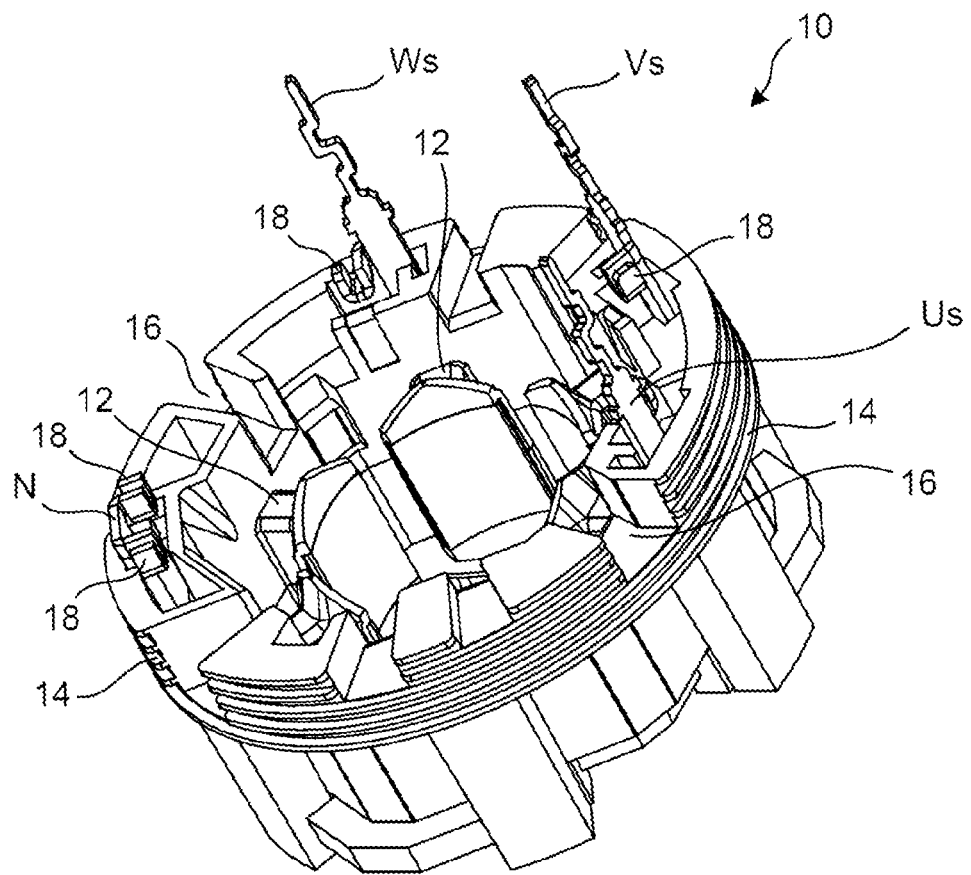
FIG. 1 is a perspective view showing an example of a stator configuration of a three-phase motor.
Figure 2:
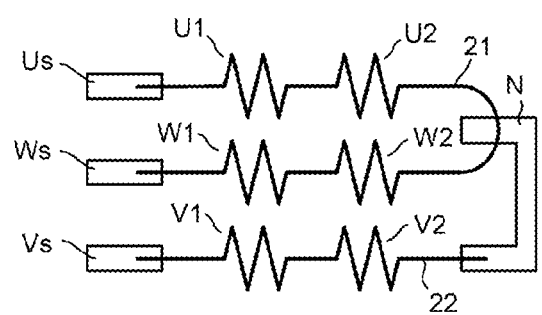
FIG. 2 is a drawing illustrating a wire connecting structure of an embodiment of the disclosure.

An exemplary embodiment of the disclosure is described with reference to the drawings. FIG. 1 shows an example of a stator configuration of a three-phase motor to which a wire connecting structure according to an embodiment of the disclosure is applied. An illustrated stator 10 is used in an inner-rotor three-phase motor having an equivalent circuit shown in FIG. 4(*a*), and is approximately cylinder-shaped. On an inner surface of the cylinder, six salient-poles 12 formed by iron cores are disposed along a circumferential direction with equal intervals. When the stator 10 is used to assemble the motor, a conducting wire is wound to each salient-pole 12 to form coils, but the conducting wire is not shown in FIG. 1 for the sake of description. As shown in FIG. 2 and FIG. 3, the six salient-poles 12 include two salient-poles U1, U2 for a U phase, two salient-poles V1, V2 for a V phase, two salient-poles W1, W2 for a W phase, and are disposed in the circumferential direction with equal intervals in a sequence of the salient-pole U1→the salient-pole V1→the salient-pole W1→the salient-pole U2→the salient-pole V2→the salient-pole W2.

On an upper end surface of the stator 10, three external connection terminals Us, Vs, Ws made of metal, which correspond respectively to the U phase, the V phase and the W phase, and a neutral point N formed as a short circuit terminal made of metal are arranged so as to extend from the upper end surface of the stator 10. The external connection terminals Us, Vs, Ws are used for electrical connection to an external driver circuit and the like, thus a protruding length from the upper end surface of the stator 10 is long; while the neutral point N is not used for the connection to an external circuit, thus the protruding length is short. A connecting portion 18 which has a U-shaped cross-section and receives the conducting wire is formed on each of the external connection terminals Us, Vs, Ws. Two similar connecting portions 18 are formed on the neutral point N. On an external side surface of the cylinder of the stator 10, multiple grooves 14 for receiving the conducting wire which becomes a jumper wire section between the coils are arranged in parallel to each other. In order to extract the conducting wire disposed inside the groove 14 to the position of the salient-pole 12, multiple notched portions 16 are formed on the upper end of the stator 10.

(Wire Connecting Structure)

FIG. 2 is a drawing illustrating the wire connecting structure of the embodiment. Here, the coils for forming the stator 10 include two conducting wires which are a first conducting wire 21 and a second conducting wire 22. The first conducting wire 21 is used in the coil of the U phase and the W phase, and the second conducting wire 22 is used in the coil of the V phase. Using the external connection terminal Us for the U phase as a starting point, the first conducting wire 21 forms the coil of the salient-pole U1, the jumper wire between the salient-pole U1 and the salient-pole U2, the coil of the salient-pole U2, the jumper wire between the salient-pole U2 and the salient-pole W2, the coil of the salient-pole W2, the jumper wire between the salient-pole W2 and the salient-pole W1, and the coil of the salient-pole W1 in this sequence in the form of a continuous single conducting wire, and is connected to the external connection terminal Ws for the W phase at last. In particular, the first conducting wire 21 is electrically connected to the short circuit terminal which is the neutral point N, without being cut as a conducting wire in the intervals of the jumper wire between the salient-pole U2 and the salient-pole W2. The position for the connection to the neutral point N becomes the position of the middle point in the first conducting wire 21. On the other hand, using the external connection terminal Vs for the V phase as a starting point, the second conducting wire 22 forms is the coil of the salient-pole V1, the jumper wire between the salient-pole V1 and the salient-pole V2, and the coil of the salient-pole V2 in this sequence in the form of a continuous single conducting wire, and is connected to the short circuit terminal which is the neutral point N at last.

In the wire connecting structure, the parts which are connected to the neutral point N are a middle part of the first conducting wire 21 and the end of the second conducting wire 22, and the connection operation may be performed in two locations in the short circuit terminal forming the neutral point N. As a result, compared with an existing wire connecting structure illustrated using FIGS. 4(a) and 4(b), the location to perform the connection processing can be reduced, and the short circuit terminal forming the neutral point N can also be miniaturized. Furthermore, in the three-phase motor of the embodiment, the size of the short circuit terminal forming the neutral point N can be reduced, and the stator 10 can be light-weighted.

(Wire Connecting Method)

Next, FIG. 3 is used to illustrate a procedure of forming the coils of each salient-pole. FIG. 3 is a plan view obtained by observing the stator 10 from above. In FIG. 3, the first conducting wire 21 is represented by a bold solid line, and the second conducting wire 22 is represented by a bold broken line. Besides, in each salient-pole, the conducting wire is generally wound in multilayers, but here the conducting wire is shown as wound in a single layer for the sake of description. In the part which becomes the jumper wire, the conducting wires 21, 22 are actually accommodated in a groove 14 formed on an outer surface of the cylinder of the stator 10; however, in order to clarify the configuration of the conducting wires 21, 22, the conducting wires 21, 22 are shown in the position outside the stator 10 in FIG. 3.

First, a coil winding machine is used to dispose the second conducting wire 22. The starting end of the second conducting wire 22 extracted from the coil winding machine is inserted into the connecting portion 18 with a U-shaped cross section of the external connection terminal Vs, and in this state, the second conducting wire 22 is wound around the salient-pole V1 to form the coil of the salient-pole V1; next, the second conducting wire 22 is extracted to an outer periphery side of the stator 10 via a notched portion 16 and is arranged within the groove 14. After that, the second conducting wire 22 is extracted into an inner side of the stator 10 from another notched portion 16, and is wound around the salient-pole V2 to form the coil of the salient-pole V2. Then, the second conducting wire 22 is inserted into one connecting portion 18 of the neutral point N, and the second conducting wire 22 is cut in a position on the coil winding machine side. Accordingly, using the external connection terminal Vs for the V phase as the starting point, the coil of the salient-pole V1, the jumper wire between the salient-pole V1 and the salient-pole V2, and the coil of the salient-pole V2 to the neutral point N are formed by one second conducting wire 22.

Next, the coil winding machine is used to dispose the first conducting wire 21 in a similar way. The starting end of the first conducting wire 21 extracted from the coil winding machine is inserted into the connecting portion 18 with a U-shaped cross section of the external connection terminal Us, the first conducting wire 21 is wound around the salient-pole U1 to form the coil of the salient-pole U1, and the first conducting wire 21 is arranged within the groove 14 on the outer periphery side of the cylinder of the stator 10. Next, the coil of the salient-pole U2 is formed. After the coil of the salient-pole U2 is formed, the first conducting wire 21 is tucked into the other connecting portion 18 of the neutral point N, and the first conducting wire 21 is arranged within a groove 14 to a position corresponding to the salient-pole W2. After that, the coil of the salient-pole W2 is formed and then the coil of the salient-pole W1 is formed in a way similar to the case of the U phase. Because the connecting portion 18 of the neutral point N is a groove with a U-shaped cross section, the first conducting wire 21 is arranged above the connecting portion 18 from one end side of the groove-shaped connecting portion 18 toward the other end side. After that, by pushing the first conducting wire 21 into the connecting portion 18, the first conducting wire 21 can be tucked into the connecting portion 18 so as to pass from one end side of the connecting portion 18 to the other end side without being cut. After the coil of the salient-pole W1 is formed by the first conducting wire 21, the first conducting wire 21 is inserted into the connecting portion 18 of the external connection terminal Ws, and the second conducting wire 22 is cut in a position on the coil winding machine side. Accordingly, using the external connection terminal Us for the U phase as the starting point, the coil of the salient-pole U1, the jumper wire between the salient-pole U1 and the salient-pole U2, the coil of the salient-pole U2, the neutral point N, the jumper wire between the neutral point N and the salient-pole W2, the coil of the salient-pole W2, the jumper wire between the salient-pole W2 and the salient-pole W1, and the coil of the salient-pole W1 to the external connection terminal Ws for the W phase are formed by one first conducting wire 21.

After the first conducting wire 21 and the second conducting wire 22 are disposed in the above-mentioned way, the conducting wires 21, 22 inserted into the connecting portion 18 are electrically connected to the connecting portion 18 by fusing or brazing. As a result, the first conducting wire 21 is electrically connected to the external connection terminal Us at one end, electrically connected to the short circuit terminal of the neutral point N in the middle portion, and electrically connected to the external connection terminal Ws at the other end. The second conducting wire 22 is electrically connected to the external connection terminal Vs at one end, and is electrically connected to the short circuit terminal of the neutral point N at the other end. Therefore, the stator 10 shown by the equivalent circuit schematic in FIG. 4(a) is completed by two conducting wires 21, 22.

OTHER EMBODIMENTS

The above-mentioned embodiment is an exemplary embodiment of the disclosure and is not limitative, and various alterations may be implemented in a scope not changing the spirit of the disclosure. In the description above, the description is made to a case in which the salient-pole number of each phase is 2, but the disclosure is not limited to this, and the salient-pole number of each phase may be 1 or 3 or more than 3. When the salient-pole number of each phase is n (n is an integer greater than or equal to 3) for example, one conducting wire is used to continuously wind the coils of n salient-poles of the U phase, then the conducting wire is pulled around the neutral point, after which the coils of n salient-poles of the W phase are continuously wound. As for the V phase, another conducting wire is used to continuously wind the coils of n salient-poles, and then the conducting wire is connected to the neutral point. In addition, in the above-mentioned description, the coils of the salient-poles of the U phase and the W phase are formed by a single first conducting wire 21; however, the combination of phases of which the coils are wound by a single first conducting wire is not limited to the combination of the U phase and the W phase, and may be the combination of the U phase and the V phase or the combination of the V phase and the W phase.

What is claimed is:

1. A wire connecting structure, which is the wire connecting structure of coils wound to each salient-pole in a three-phase motor having respective salient-pole of a first phase, a second phase and a third phase, wherein
    the coils of the salient-poles belonging to any two phases among the first phase, the second phase and the third phase are formed by a first conducting wire, wherein the first conducting wire is a single continuous wire, and
    the coil of the salient-pole belonging to a rest one phase among the first phase, the second phase and the third phase is formed by a second conducting wire, wherein the second conducting wire is another single continuous wire,
    wherein the coils of the salient-poles formed by the first conducting wire comprise a coil of a first salient-pole, a coil of a second salient-pole, a coil of a third salient-pole and a coil of a fourth salient-pole, wherein the first conducting wire is sequentially wound around the first salient-pole, the second salient-pole, the third salient-pole and the fourth salient-pole, and the coils of the salient-poles are disposed in a circumferential direction with equal intervals in a sequence of the first salient-pole, the third salient-pole, the second salient-pole and the fourth salient-pole.

2. The wire connecting structure according to claim 1, wherein one end of the first conducting wire is electrically connected to an external connection terminal corresponding to one of the any two phases, the other end of the first conducting wire is electrically connected to an external connection terminal corresponding to the other of the any two phases, and a middle point of the first conducting wire is electrically connected to a short circuit terminal of a neutral point; and
    one end of the second conducting wire is electrically connected to an external connection terminal corresponding to the rest one phase, and the other end of the second conducting wire is electrically connected to the short circuit terminal.

3. The wire connecting structure according to claim 2, wherein there are multiple salient-poles for each phase, in an interval between one end of the first conducting wire and the middle point, the first conducting wire is wound to the multiple salient-poles corresponding to one of the any two phases, and in an interval between the middle point and the other end of the first conducting wire, the first conducting wire is wound to the multiple salient-poles corresponding to the other of the any two phases.

4. A three-phase motor comprising a stator having the wire connecting structure according to claim 1.

5. A three-phase motor comprising a stator having the wire connecting structure according to claim 2.

6. A three-phase motor comprising a stator having the wire connecting structure according to claim 3.

7. A wire connecting method, which is the wire connecting method of coils wound to each salient-pole in a three-phase motor having respective salient-pole of a first phase, a second phase and a third phase, comprising:
    a first process, in which a first conducting wire is used to continuously wind the coils of the salient-poles belonging to any two phases among the first phase, the second phase and the third phase, wherein the first conducting wire is a single continuous wire; and
    a second process, in which a second conducting wire is used to wind the coil of the salient-pole belonging to the rest one phase among the first phase, the second phase and the third phase, wherein the second conducting wire is another single continuous wire,
    wherein the coils of the salient-poles formed by the first conducting wire comprise a coil of a first salient-pole, a coil of a second salient-pole, a coil of a third salient-pole and a coil of a fourth salient-pole, wherein the first conducting wire is sequentially wound around the first salient-pole, the second salient-pole, the third salient-pole and the fourth salient-pole, and the coils of the salient-poles are disposed in a circumferential direction with equal intervals in a sequence of the first salient-pole, the third salient-pole, the second salient-pole and the fourth salient-pole.

8. The wire connecting method according to claim 7, wherein the first process comprises:
    a neutral point extraction process, in which a starting end of the first conducting wire is extracted to a position of the external connection terminal which corresponds to one of the any two phases, then while a position of the starting end is maintained, the first conducting wire is wound to the salient-pole which corresponds to one of the any two phases and is extracted to a position of a short circuit terminal of the neutral point; and
    a process, which follows the neutral point extraction process, and in which the first conducting wire is wound to the salient-pole which corresponds to the other of the any two phases while maintaining a state of being extracted to the position of the short circuit terminal, and a closing end of the first conducting wire is arranged to the position of the external connection terminal which corresponds to the other of the any two phases; and in the second process, one end of the second conducting wire is arranged to the position of the external connection terminal which corresponds to the rest one phase, the other end of the second conducting wire is arranged to the position of the short circuit terminal, the wire connecting method further comprises a third process, in which the starting end of the first conducting wire is electrically connected to the external connection terminal which corresponds to one of the any two phases, the first conducting wire is electrically connected to the short circuit terminal at the position of the short circuit terminal, the closing end of the first conducting wire is electrically connected to the external connection terminal which corresponds to the other of the any two phases, one end of the second conducting wire is electrically connected to the external connection terminal which corresponds to the rest one phase, and the other end of the second conducting wire is electrically connected to the short circuit terminal.

9. The wire connecting method according to claim 8, wherein there are multiple salient-poles for each phase.

* * * * *